Jan. 28, 1941.  W. W. GLEASON  2,230,110
SPRING KNOTTING AND SHAPING MACHINE
Filed Oct. 19, 1938  4 Sheets-Sheet 1
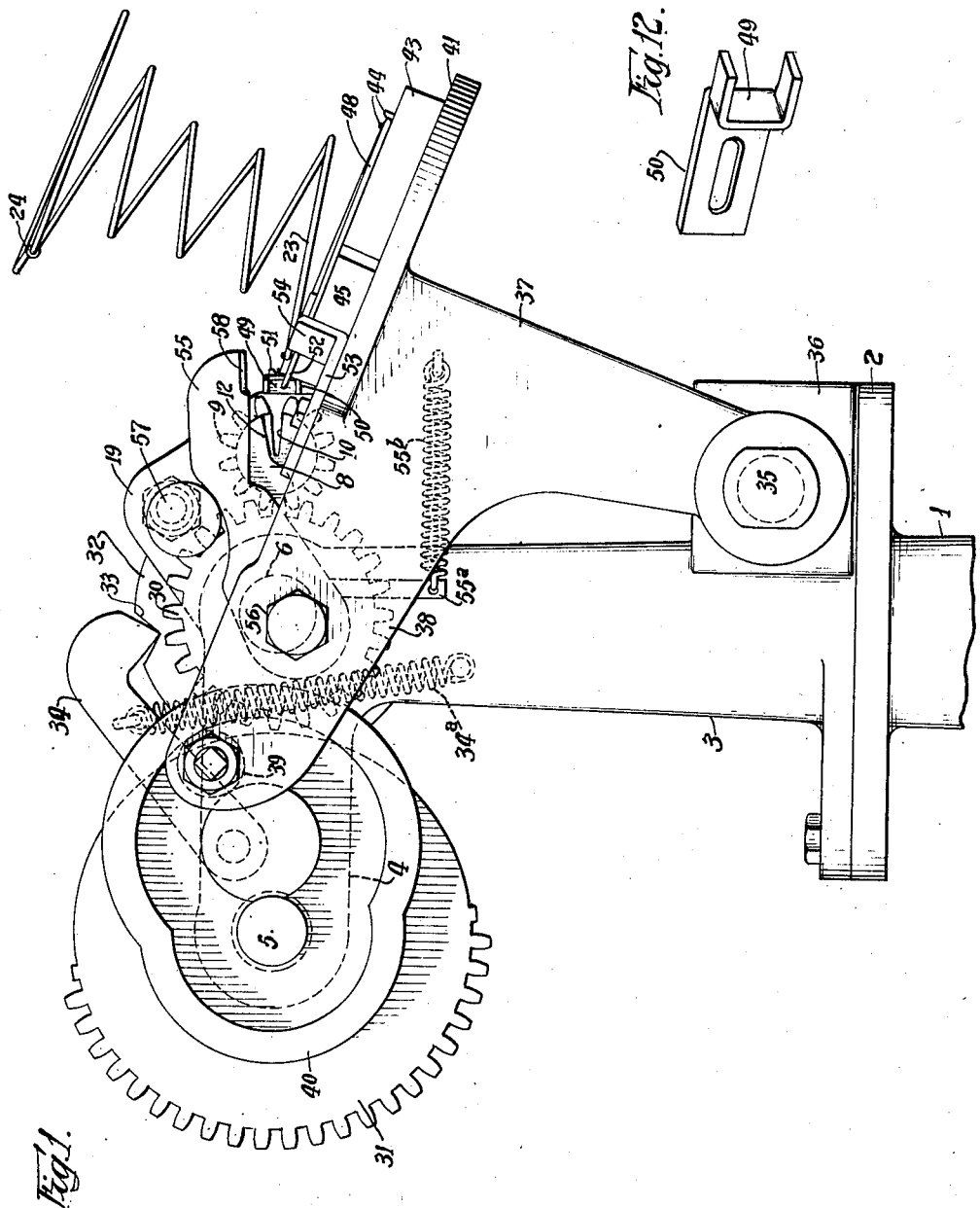
Inventor:
William W. Gleason,
By: Rudolph Wm. Lotz
Attorney.

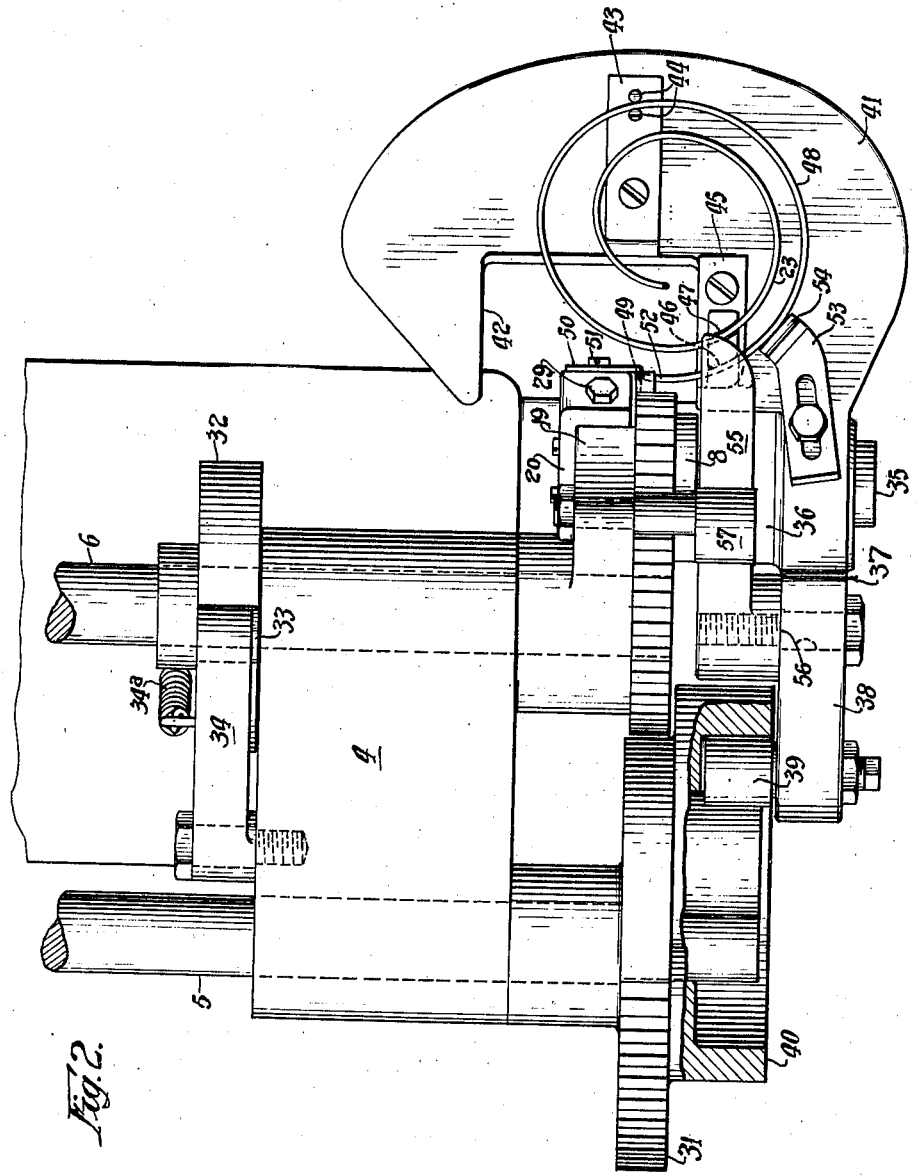

Jan. 28, 1941.  W. W. GLEASON  2,230,110
SPRING KNOTTING AND SHAPING MACHINE
Filed Oct. 19, 1938  4 Sheets-Sheet 3
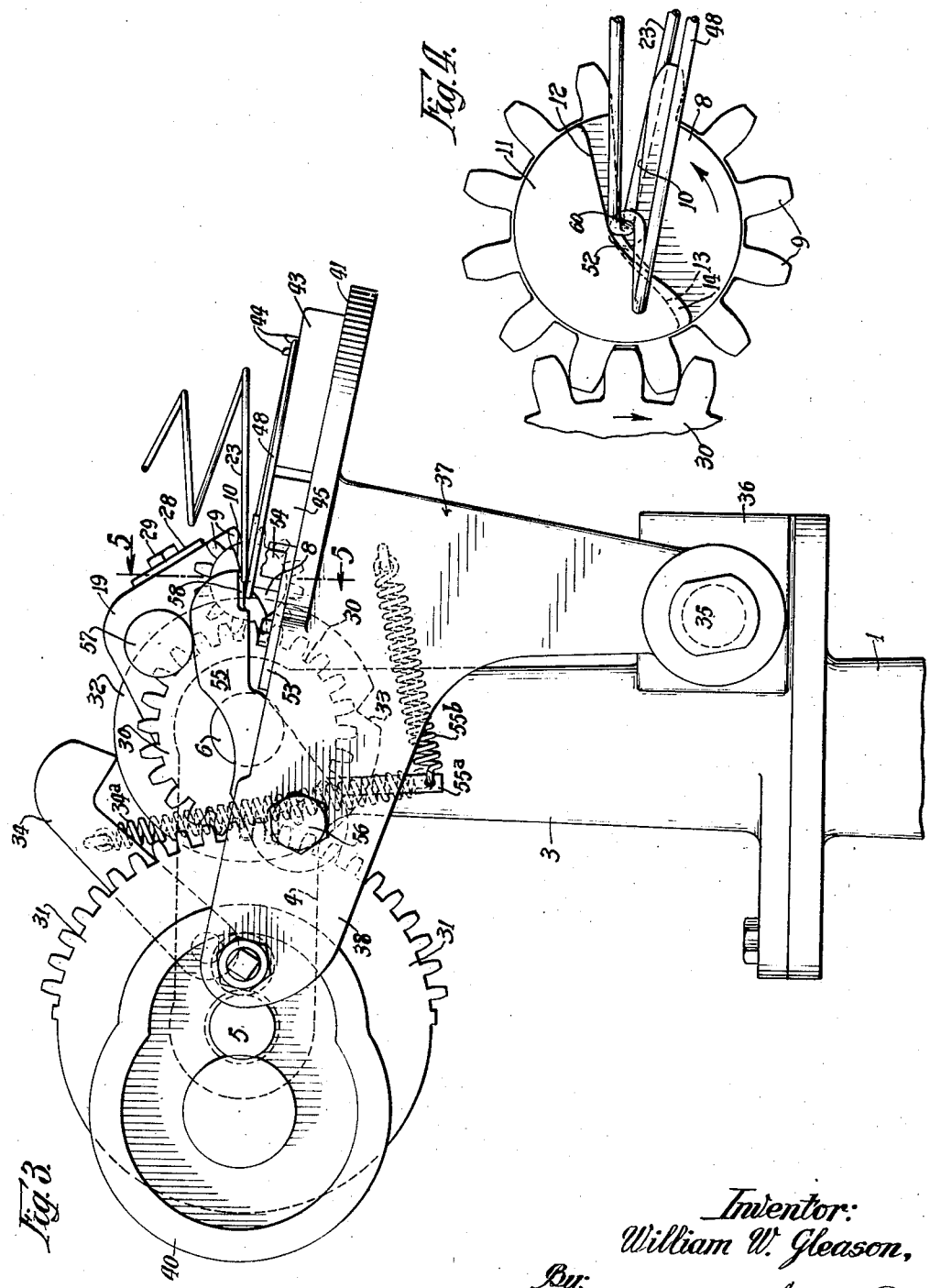
Inventor:
William W. Gleason,
By:

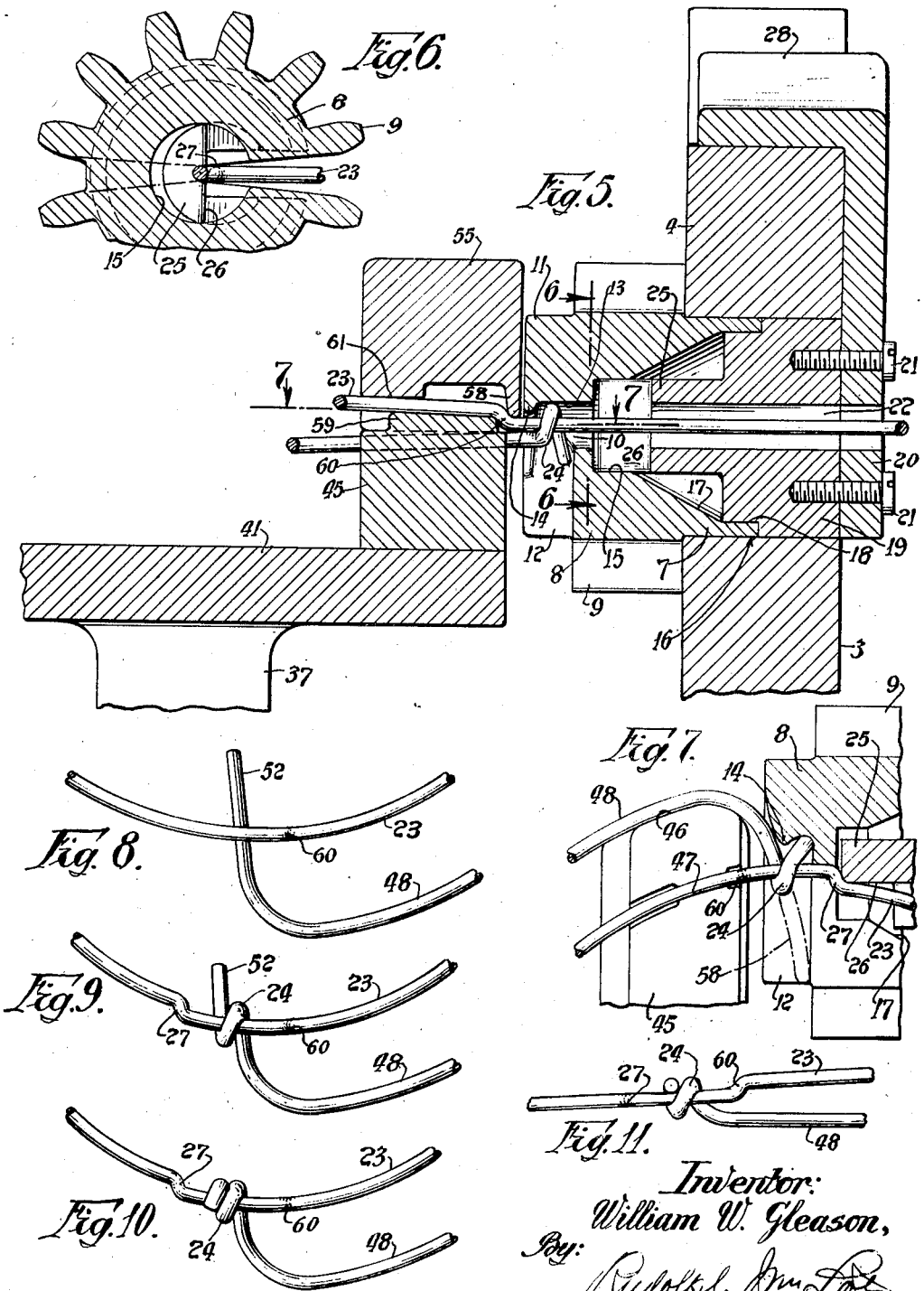

Patented Jan. 28, 1941

2,230,110

UNITED STATES PATENT OFFICE 2,230,110

SPRING KNOTTING AND SHAPING MACHINE

William W. Gleason, Chicago, Ill., assignor to Nachman Springfilled Corporation, Chicago, Ill., a corporation of Illinois Application October 19, 1938, Serial No. 235,739

14 Claims. (Cl. 140—101)

The object of the present invention is to provide a machine for knotting springs of the type most commonly used in the upholstery and bedding art, which also automatically shapes the portions of the spring immediately adjacent the knots thereof to distort the same for purposes of preventing slippage of the knots under the influence of stresses on the spring. Such slippage of knots tend to shorten the spring and to cause squeaking therein. It is also disadvantageous in the manufacture of assemblies of upholstery springs incorporating the knotted type, because slippage of the knots causes relative displacement of same at opposite ends of the springs and, by reason of the somewhat non-circular shape of the terminal coils, alignment of the rows of such springs with each other for coupling by means of helical tie wires, or other devices, is rendered difficult and costly, because too much hand labor is required for correcting relative positions of springs in contiguous rows and in guiding the helical tie wires, or other coupling devices, into desired relation to said relatively displaced spring portions.

Springs are generally heat-treated to harden them after they are knotted, and in instances where the knots are initially tight, they expand under the influence of high temperature and become loose. The heat also affects the whole spring by increasing the length thereof and in the cooling thereof the knots are the last to contract. The result is that said knots become displaced in either of two directions from their predetermined initial positions. The springs are thus lengthened or shortened slightly, but the relative positions of the knots at opposite ends of each spring is seldom the same in any lot of about ten springs. One of the knots may move from its initial position and remain at another point when the spring is heated and cooled, and the other knot may move in the same or in opposite direction and so remain in one or more springs and in others they may remain in or be restored to their initial positions during heating and cooling.

In the knotting of the spring, it is necessary that there be no bends or distortions in the coil of the spring about which the knot is formed, which will interfere with tight coiling of the knot, and it is, therefore, one of the main objects of the present invention to so manipulate the spring during each knotting operation that the knot retaining bends or deformities are formed, respectively, prior to the beginning of and during the knotting operation, as is hereinafter fully described.

Other objects of the invention will be readily understood from or particularly set forth in the following specification.

A suitable embodiment of the invention is illustrated in the accompanying drawings, wherein:

Fig. 1 is a side elevation of a spring knotting machine constructed in accordance with the invention.

Fig. 2 is a fragmentary top plan view of the same, showing a part of the actuating cam of the machine broken away.

Fig. 3 is a view similar to Fig. 1 showing the operating parts of the machine in a different position than shown in Fig. 1.

Fig. 4 is a fragmentary end elevation, on an enlarged scale showing the knotting head and a fragment of the drive gear therefor with the lower end of a spring positioned in the slot of the head prior to actuation of the latter.

Fig. 5 is a fragmentary vertical transverse sectional view on an enlarged scale, taken on the line 5—5 of Fig. 3.

Fig. 6 is a fragmentary detail vertical sectional view on an enlarged scale, of the coiling head, taken on the line 6—6 of Fig. 5.

Fig. 7 is a fragmentary detail plan sectional view taken on the line 7—7 of Fig. 5.

Figs. 8, 9 and 10 are fragmentary plan views looking down upon the lower terminal end of an upholstery spring to illustrate the results of successive operations of the machine.

Fig. 11 is a fragmentary detail side elevation of the knot portion of the lower terminal portion of the spring after the knotting thereof is completed.

Fig. 12 is a perspective view of a certain adjustable plate on an enlarged scale.

The machine comprises a supporting base 1, having a top plate 2 to which the base of the mechanism-carrying standard 3 is suitably secured.

Integral with the upper end of the standard 3 is a bearing bracket 4 equipped with bearings for the drive shaft 5, a countershaft 6 parallel with shaft 5, and the bearing for the hub 7 of the coiling head 8. The latter is equipped with spur gear teeth 9, a radial slot 10 extending at its inner end about the axis thereof and terminating at the periphery of said head, and with end projection 11 of almost semi-circular contour which provides a shoulder 12 tangential with the inner wall of the slot 10 and extending at a sharply acute angle to the normally top wall of said slot and substantially bordering the latter. Extending in the opposite direction from the shoulder 12 and constituting an extension of the latter disposed at a slight angle thereto, is the shoulder 13 which is equipped with an edge flange 14 (Figs. 4 and 5).

The head 8 is bored out cylindrically as at 15 from its inner end lying within the bearing 16, to a diameter appreciably greater than the inner arcuate wall of the slot 10, said bore being sharply tapered for a further portion 17 and terminates in a cylindrical portion 18 which receives a portion of a rigid block 19 secured to a plate 20 by means of set screws 21.

The block 19 is equipped with a radial slot 22 which is normally aligned with the radial slot 10 of the head 8 to receive a portion of the coil 23 of the spring end which is adapted to receive the knot 24 at the extremity of the terminal coil of the said spring.

The portion 25 of the block 19 lying within the bore portion 15 of the head 8, is opposed to the mouth of the slot 22 of said block with its flat face 26 disposed diametrically of the head 8 (Fig. 6). The outer edge of said flat face 26 is slightly curved to provide a bending point for a point in the coil 23, as hereinafter described, for forming the offset 27 in the latter adjacent one side of the knot 24 of the spring. The said flat face 26 is vertical and the face of the portion 25 behind the same is arcuate and shown as being eccentric to the bore of the head 8.

The plate 20 is equipped with a flange 28 which is disposed in a plane extending at an angle of about 45 degrees to the vertical plane of the axis of the head 8 and is secured to the block 19 by means of the set screw 29 (Figs. 2, 3 and 5).

The head 8 is geared to the countershaft 6 by means of the spur gear wheel 30 meshing with the teeth 9 and with the arcuate row of teeth of the spur gear wheel 31 on the drive shaft 5, the gear ratio between the gear 31 and head 8 being, in the instance illustrated, two to one, so that each revolution of gear 31 will effect two revolutions of the head 8.

A conventional punch press clutch, not shown, is associated with the drive shaft 5 and a power shaft, not shown, to cause said shaft 5 to complete a single revolution at each throw-in of the said punch press clutch, the latter being manually controlled.

Rigid with the shaft 6 is a disk 32 equipped in its circumferential face with a V-shaped recess 33 in which the similarly shaped end of the arm 34 engages, said arm being pivotally mounted upon the bearing block 4 (Fig. 2) and maintained engaged with said recess by means of a tension spring 34a (Figs. 1 and 2). The function of said arm is conventional to cooperate with the recess 33 as a cam element to bring the head 8 into its desired normal position against lost motion in the gear chain above described.

Pivotally mounted upon the standard 3 by means of a suitable pivot member 35 engaged in a bracket 36 (Figs. 1 and 2) is the lower end of one arm of a substantially T-shaped rocking member 37. The latter is equipped at one side of its upper end portion with an arm 38 which, as shown in Fig. 2, carries an anti-friction roller 39 at its outer end. Said roller engages in the groove of the cam 40 rigid with the shaft 5.

The upper end of the rocking member 37 presents a flat surface portion 41 having a recess 42 therein opposed to and adapted to receive the portion of the block 19 in which the bearing for the head 8 is disposed together with the projecting portion of said head 8.

Mounted upon said surface portion 41 between the side walls of the recess 42, is a plate or block 43 equipped with a pair of upstanding pins 44 between which a point in the terminal coil at the lower end of a spring is adapted to be received. Mounted upon the portion of the arm 38 of said rocking member 37 is an anvil block 45 presenting two spaced apart arcuate shoulders 46 and 47, respectively, which are opposed to the slot of the coiling head 8, but are spaced therefrom axially of said head when the member 37 is in the position of Fig. 1. A portion of the terminal coil 48 of the spring, spaced from the extremity thereof, is brought into contact with the shoulder 46 of said block and the adjacent portion of the coil 23 of the spring is brought into contact with the shoulder 47. The extremity of the terminal coil is abutted against the arm 49 of an L-shaped plate 50 secured to the block 19 (Fig. 2), the body of the plate 50 being equipped with a horizontal slot through which passes the shank of the set screw 51 for securing said plate in place.

The said pins 44, shoulders 47 and 46 and the arm 49 of the plate 50 determines the proper position of the coils 23 and 48 relatively to the coiling mechanism immediately precedent to the knotting operation. The flange 49 of the plate 50 determines the length of the ultimate arm 52 of the terminal coil 48 of the spring.

The corner of the shoulder 46 of the anvil block 45 next adjacent the inner face of the arm 38, cooperates with outer end of the innermost wall of the slot 10 of the coiling head 8 to bend the terminal portion of the terminal coil 48 of the spring to form the said arm 52 to extend inwardly beyond the adjacent portion of the coil 23 as the rocking member 37 swings from the position shown in Figs. 1 and 2 to the position shown in Fig. 3. An adjustable plate 53 mounted upon the arm 38 presents the upwardly projecting flange 54 disposed angularly to the plate 53 which cooperates with the shoulder 46 to retain the terminal coil 48 firmly in its predetermined position (above described) during the bending operation last described and during the coiling operation of the said head 8.

The anvil block 45 is so called because it cooperates with the clamping and bending arm 55 pivotally mounted at one end upon the arm 38 at a point 56 substantially midway between the roller 39 and the block 45 to clamp the terminal coil 48 against disengagement from the shoulder 46 prior to the attainment of the arm 38 of its innermost limit of movement. The upper face of the arm 55 constitutes a cam surface which is engaged by an anti-friction roller 57 mounted upon the block 19 for forcing said arm 55 into and holding it in its wire-clamping position during the last one-third of the movement of the member 37 to the position of Fig. 3.

The said clamping member 55 is equipped with a downwardly projecting flange 58 which is spaced from its inner side edge of the projection 59 of the anvil member 45. The coil 23 of the spring lies upon the said projection 59 when said spring is in the position shown in Fig. 2, the shoulder 46 being disposed at a lower elevation than the shoulder 47 with which the coil 23 is engaged.

As said arm 55 is depressed, the said flange 58 cooperates with projection 59 and the lower wall of the slot 10 of the coiling head 9 to bend an offset 60 in the coil 23, the further movement of said arm 55 causing the projection 61 thereof to clamp the coil 23 against movement relatively to the anvil member 45. The arm 55 does not engage the coil 48.

The member 37 is moved from the position of Fig. 1 to that of Fig. 3 immediately after the aforesaid punch-press clutch is thrown to rotate the shaft 5, thereby causing the spring to be carried forward to throw a portion of the coil 23 into the slot 10 of the coiling head 8 and an adjacent portion into the slot 22 of the block 19. During this movement the shoulder 46 and flange 54 of plate 53 cooperate with the innermost wall of the said slot 10 to bend the terminal end of the coil 48 to form the arm 52 and during this bending operation the flange 58 of the arm 55 forms the offset 60 in the coil 23 outwardly of that portion of the coil 23 about which the terminal end portion of the arm 52 is coiled during rotation of head 8 immediately following the movement of the arm 55 to its limit of movement wherein it clamps a portion of the coil 23 against the projection 59 of the anvil member 45.

It will be noted by reference to Fig. 5, that after the offset 60 is formed in the coil 23, the portion of said coil engaged in slots 10 and 22 is disposed in a substantially horizontal plane, this being substantially perpendicular to the axis of the spring and disposed outwardly axially of the spring from the portion of the coil 23 to the left of said offset 60 as shown in Fig. 5.

The offset 60 is spaced sufficiently from the portion of the coil 23, about which the terminal portion of the arm 52 is coiled, to form the knot 24, as not to interfere with the operation of the head 8, the grooved shoulder 14 of which effects the said coiling of the knot 24.

At the end of the first revolution of the head 8 (as shown in Fig. 5), the portion of the coil 23 closely adjacent to the left hand side of the partially completed knot 24 is forced against the flat face 26 of the projection 25 of the block 19 to form the offset 27 in the coil 23, the said offset being less in length than the diameter of the wire of which the spring is formed so that the second coil of the knot 24 is completed in very firm encircling of the coil 23 thereby.

The offsets 60 and 27 determine the limit of slippage of the knot 24 but it is found that following the heat treating of the spring, the knot moves very slightly, if at all, from its initial position and remains there, in the great majority of instances, unless moved forcibly to another position between said offsets 60 and 27.

The spring is, of course, positioned in the machine by hand, this being easily accomplished. After forming the knot at one end of the spring, the latter is reversed and the other knot formed.

The clamping member 55 is, of course, normally held in engagement with the roller 57 by means of a bar 55a and spring 55b.

The operation of the machine is as follows:

The relative positions of the machine parts at the time that a spring 24 to be knotted is inserted by hand, is shown in Figs. 1 and 2. The latter shows clearly the position of the base of the spring with reference to the positioning of guides 44, 46, 47 and 54 upon the member 43 of the plate 41. The guide or positioning elements 46 and 47 are also shown in Fig. 7.

At the instant that the spring 24 is mounted upon the member 43, and until the mechanism is set in motion, the coiling or knotting head 8 is positioned with its radial slot 10 opposed to the nearest point in the bottom coil of the spring and the corresponding portion of the next higher coil thereof. The portion of the lower coil opposed to the slot 10 is substantially the terminal end portion of said lowest coil.

The arm 55 is disposed at the upper limit of its movement and the anvil block 45 on plate 41 is disposed at the outer limit of its movement.

The operator now actuates the punch press clutch control lever and thereupon the plate 51 and parts carried thereby swing to the left from the position of Fig. 1 to that of Fig. 3.

During this swinging movement the terminal portion 58 of the base coil of the spring passes the axis of the head 8, the end of which cooperates with the shoulder 46 to bend said portion 58 to project approximately toward the axis of the spring 24. At the instant that this bend is completed the portion of the next higher coil of the spring under which the portion 58 now projects, is positioned at the inner or head-axis end of the slot 10.

During the said swing of the plate 41, the arm 55 passes under the roller 57 to the position of Fig. 3 and cooperates with the projection 59 of the anvil block 45 to bend the offset 60 into the portion of the spring next adjacent the point at which the portion 58 passes below the coil about which the same is to be coiled.

The arm 55 now acts as a clamp and at substantially the instant that it completes its movement to this clamping position, the rotation of the head 8 will have progressed to the point at which coiling of the portion 58 of the spring begins due to engagement of the same by the parts 13—14 (Fig. 4).

During rotation of the head 8, the innermost portion of its radial slot 10 cooperates with the end portion 25 of the rigid member 19 to bend the offset 27 in the spring in a plane substantially perpendicular to the plane of the offset 60, so that the knot of the spring is confined between said offsets 27 and 60.

The offset 27 is formed as the head 8 completes a half revolution, the rotation of same being limited to a full revolution as hereinabove explained.

By reference to Fig. 6, it will be noted that the face 26 of the projection 25 is opposed to the open end of the slot 10 of the head 8 when the latter is in its idle position and the face 26 is disposed forward of the axis of head 8 a distance about equal to half the thickness of the wire of the spring. As shown in dotted lines in Fig. 6, the offset 27 is formed or completed when the innermost wall portion of slot 10 of head 8 is diametrically opposed to the plane of the face 26 of said projection 25.

I claim as my invention:

1. A machine of the type specified including a rotatable coiling head, a spring carrier, cooperating spring positioning means for engaging a spring to be knotted, mechanism for causing the carrier to bring the spring into position relatively to the coiling head for knotting by the latter, means on the carrier for clamping the spring in place thereon and for cooperation with the coiling head for bending an offset in the spring adjacent the portion thereof about which the knot is formed, a device on the machine for actuating the last-named means during the said movement of said carrier prior to the coiling operation of said head, and means within the coiling head for forming another offset in said spring during the rotation of said head to effect the knotting operation.

2. A machine of the kind specified including a rotatable coiling head, a carrier for a spring equipped with means for positioning a spring thereon preparatory to knotting the same, cooperating means on the carrier and machine frame for bending an offset in the spring adjacent the knot receiving portion thereof and clamping the spring firmly on said carrier upon completion of the movement of the latter to knotting position, cooperating means on the carrier and coiling head for bending a terminal end portion of the spring into position for coiling the same about the adjacent portion thereof contiguous to said offset as said carrier is moved to its last-named position, and means within the coiling head cooperating with the coil forming portion thereof to bend another offset in the spring on the other side of the knot receiving portion thereof during rotation of said head.

3. A machine of the kind specified including a substantially conventional rotatable coiling head, a rigid member disposed within the latter in the path of the convolution of the spring which is encircled by the knot formed by the coiling head for forming an offset in said convolution to limit travel of the knot along the same in one direction, a carrier for the spring and cooperating means on the machine frame and carrier for securing the spring to the latter and forming an offset in said convolution at the other side of said knot receiving portion to limit travel of the knot in the other direction as said carrier moves the spring into operative relation to the coiling head.

4. A machine of the type specified including a knotting mechanism, a carrier for moving springs into operative relation to said mechanism, guide means for positioning the springs on the carrier before they are moved into operative relation to the said mechanism, power actuated manually controlled means for effecting movements of said carrier and operating said mechanism in predetermined order of succession, a device automatically actuated responsively to said movement of the carrier for bending an offset in the spring and clamping the same upon the carrier during a part of said movement of the latter, and means cooperating with the first-named mechanism for bending another offset in the spring during the knotting operation.

5. A machine of the type specified including a knotting mechanism, a carrier for moving springs into operative relation to said mechanism, guide means for positioning the springs on the carrier before they are moved into operative relation to the said mechanism, power actuated manually controlled means for effecting movements of said carrier and operating said mechanism in predetermined order of succession, a device automatically actuated responsively to said movement of the carrier for bending an offset in the spring and clamping the same upon the carrier during a part of said movement of the latter, and means cooperating with the first-named mechanism for bending another offset in the spring during the knotting operation, said guide means cooperating with said mechanism to bend a terminal portion of the spring into position for coiling about another portion adjacent said offset as said carrier approaches the limit of its said movement, said respective offsets being disposed at opposite sides of the knot of the spring.

6. A machine of the type specified including a knotting mechanism, a rocking carrier for springs equipped with guide means for positioning springs thereon preparatory to knotting the same, manually controlled power means for moving said carrier from its normal position, and back, to bring springs carried thereby into operative relation to said mechanism and for actuating the latter in predetermined order of succession, a device automatically actuated responsively to movement of the carrier first-mentioned for bending an offset in the spring adjacent one side of the knot thereof prior to completion of said movement, and a device associated with said mechanism for bending an offset in the spring adjacent the other side of the knot during the knotting operation.

7. A machine of the type specified including a knotting mechanism, a rocking carrier for springs equipped with guide means for positioning springs thereon preparatory to knotting the same, manually controlled power means for moving said carrier from its normal position, and back, to bring springs carried thereby into operative relation to said mechanism and for actuating the latter in predetermined order of succession, a device automatically actuated responsively to movement of the carrier first mentioned for bending an offset in the spring adjacent one side of the knot thereof prior to completion of said movement, and a device associated with said mechanism for bending an offset in the spring adjacent the other side of the knot during the knotting operation, said guide means cooperating with said mechanism to bend a terminal end portion of the spring into predetermined position relatively to said mechanism as said carrier approaches and completes its first-named movement.

8. A machine of the type specified including a knotting mechanism, a rocking carrier for springs equipped with guide means for positioning springs thereon preparatory to knotting the same, manually controlled power means for moving said carrier from its normal position, and back, to bring springs carried thereby into operative relation to said mechanism and for actuating the latter in predetermined order of succession, a spring clamping and bending device automatically actuated responsively to movement of the carrier first-mentioned for bending an offset in the spring adjacent one side of the knot and holding the spring against movement relatively to the carrier, and a device associated with said mechanism for bending an offset in the spring adjacent the other side of the knot during the knotting operation.

9. A machine of the type specified including a knotting mechanism, a rocking carrier for springs equipped with guide means for positioning springs thereon preparatory to knotting the same, manually controlled power means for moving said carrier from its normal position, and back, to bring springs carried thereby into operative relation to said mechanism and for actuating the latter in predetermined order of succession, a spring clamping and bending device automatically actuated responsively to movement of the carrier first-mentioned for bending an offset in the spring adjacent one side of the knot and holding the spring against movement relatively to the carrier, and a device associated with said mechanism for bending an offset in the spring adjacent the other side of the knot during the knotting operation, said guide means cooperating with said mechanism to bend a terminal end portion of the spring into predetermined position relatively to said mechanism as said carrier approaches and completes its first-named movement.

10. A machine of the type specified comprising a power actuated manually controlled knotting mechanism, a spring carrier operatively associated with said mechanism for movement thereby toward and from the same preceding and following each knotting operation, guide means for positioning springs on the carrier while the latter is at rest, automatic means actuated during movement of said carrier toward said mechanism and operatively associated with said guide means for bending an offset in the spring at one side of the knot receiving portion thereof before said carrier completes its movement toward said mechanism and means included in said mechanism for bending another offset in the spring adjacent the other end of the knot receiving portion thereof during the knotting operation, said last-named offset being laterally disposed relatively to the first-named offset.

11. A machine of the type specified comprising a power actuated manually controlled knotting mechanism, a spring carrier operatively associated with said mechanism for movement thereby toward and from the same preceding and following each knotting operation, guide means for positioning springs on the carrier while the latter is at rest, automatic means actuated during movement of said carrier toward said mechanism and operatively associated with said guide means for bending an offset in the spring at one side of the knot receiving portion thereof before said carrier completes its movement toward said mechanism and means included in said mechanism for bending another offset in the spring adjacent the other end of the knot receiving portion during the knotting operation, said last-named offset being laterally disposed relatively to the first-named offset, said guide means and device cooperating to clamp the spring upon the carrier against movement relatively thereto during the knotting operation.

12. A machine of the type specified comprising a power actuated manually controlled knotting mechanism, a spring carrier operatively associated with said mechanism for movement thereby toward and from the same preceding and following each knotting operation, guide means for positioning springs on the carrier while the latter is at rest, automatic means actuated during movement of said carrier toward said mechanism and operatively associated with said guide means for bending an offset in the spring at one side of the knot receiving portion thereof before said carrier completes its movement toward said mechanism and means included in said mechanism for bending another offset in the spring adjacent the other end of the knot receiving portion during the knotting operation, said last-named offset being laterally disposed relatively to the first-named offset, said guide means and device cooperating to clamp the spring upon the carrier against movement relatively thereto during the knotting operation, and both said guide means and said device cooperating with said mechanism for bending a terminal end portion of the spring into operative relation to said mechanism for coiling about said portion of said spring between said offsets as said carrier approaches the limit of its movement toward said mechanism.

13. A spring knotting machine including a rotatable coiling head, a carrier for the spring to be knotted equipped with means for retaining the spring in a predetermined position thereon, a spring clamping device, means for imparting a relative movement to said carrier and said head for causing a portion of the spring to be received in said head, means included in said spring-retaining means for cooperation with said head to bend a terminal end portion of said spring to project substantially toward the axis of said spring during said relative movement of said carrier and said head, cooperating means on said carrier and the machine frame for actuating said clamping device to engage the spring as said relative movement of said head and carrier is completed, and means on said clamp cooperating with said spring-retaining means for bending an offset in said spring as said clamp approaches and completes its last-named movement.

14. A spring knotting machine including a rotatable coiling head, a carrier for the spring to be knotted equipped with means for retaining the spring in a predetermined position thereon, a spring clamping device, means for imparting a relative movement to said carrier and said head for causing a portion of the spring to be received in said head, means included in said spring-retaining means for cooperation with said head to bend a terminal end portion of said spring to project substantially toward the axis of said spring during said relative movement of said carrier and said head, cooperating means on said carrier and the machine frame for actuating said clamping device to engage the spring as said relative movement of said head and carrier is completed, and means on said clamp cooperating with said spring-retaining means for bending an offset in said spring as said clamp approaches and completes its last-named movement, and means disposed within the coiling head for cooperation with the latter for bending another offset in the spring during rotation of said head.

WILLIAM W. GLEASON.